United States Patent [19]
Salestrom

[11] Patent Number: 5,868,087
[45] Date of Patent: *Feb. 9, 1999

[54] AGRICULTURAL WATER RETENTION AND FLOW ENHANCEMENT MIXTURE

[76] Inventor: Ronald D. Salestrom, P.O. Box 90986, Tucson, Ariz. 85752-0986

[*] Notice: The term of this patent shall not extend beyond the expiration date of Pat. No. 5,649,495.

[21] Appl. No.: 897,435

[22] Filed: Jul. 21, 1997

Related U.S. Application Data

[63] Continuation-in-part of Ser. No. 491,623, Jun. 19, 1995, Pat. No. 5,649,495.

[51] Int. Cl.⁶ .................................................. A01C 21/00
[52] U.S. Cl. .......................... 111/132; 111/130; 111/200; 428/407
[58] Field of Search .................. 47/9, 58, 1.01; 111/132, 130, 200, 174, 118, 76, 40; 172/40; 428/407, 409

[56] References Cited

U.S. PATENT DOCUMENTS

| | | |
|---|---|---|
| 3,397,748 | 8/1968 | Whitesides . |
| 3,417,171 | 12/1968 | Eberle et al. . |
| 3,545,130 | 12/1970 | Strother, Jr. et al. ...................... 47/58 |
| 3,759,197 | 9/1973 | Bracke . |
| 3,878,175 | 4/1975 | Steckler . |
| 3,981,100 | 9/1976 | Weaver et al. . |
| 4,058,124 | 11/1977 | Yen et al. . |
| 4,155,314 | 5/1979 | O'Callaghan et al. . |
| 4,168,593 | 9/1979 | Jankowiak . |
| 4,196,678 | 4/1980 | Lore et al. . |
| 4,463,509 | 8/1984 | Leonard . |
| 4,540,427 | 9/1985 | Helbling . |
| 4,559,074 | 12/1985 | Clarke . |
| 4,606,675 | 8/1986 | Mitani et al. . |
| 4,626,472 | 12/1986 | Boutin . |
| 4,683,258 | 7/1987 | Itoh et al. . |
| 5,001,995 | 3/1991 | Mikkelsen . |
| 5,033,398 | 7/1991 | Froc . |
| 5,073,612 | 12/1991 | Irie et al. . |
| 5,107,928 | 4/1992 | Hilterhaus . |
| 5,136,954 | 8/1992 | Fetaz et al. . |
| 5,303,663 | 4/1994 | Salestrom . |
| 5,514,191 | 5/1996 | Miller et al. ................................ 47/1.1 |
| 5,649,495 | 7/1997 | Salestrom ................................ 111/132 |

FOREIGN PATENT DOCUMENTS

| | | |
|---|---|---|
| 274348 | 12/1989 | Germany . |
| 204680 | 11/1984 | Japan . |
| 34572 | 9/1990 | Japan . |

*Primary Examiner*—Michael J. Carone
*Assistant Examiner*—Robert Pezzuto

[57] ABSTRACT

A technique of applying selected chemicals for increasing agricultural water retention and minimizing erosion. The technique applies water absorbent polymers into the top layer of the field. These polymers create a water barrier within the soil. Subsequently, a linear polymer such as polyacrylamide is applied to the soil's surface to minimize erosion during irrigation and precipitation. The water absorbent polymers assist in the thorough application of the linear polymer as the linear polymer is maintained at the surface area and prevented from leeching away.

16 Claims, 4 Drawing Sheets

AGRICULTURAL WATER RETENTION AND FLOW ENHANCEMENT MIXTURE

This is a continuation-in-part of U.S. patent application Ser. No. 08/491,623, filed Jul. 6, 1995, and entitled "Agricultural Water Retention Mixture and Application Technique" now U.S. Pat. No. 5,649,495, issued Jul. 22, 1997.

BACKGROUND OF THE INVENTION

This invention relates generally to agriculture and more particularly to a technique for retaining water and nutrients in the soil to assist in the growing of agricultural crops.

As long ago as 3150 B.C., when irrigation was introduced to the River Nile valley, there was the knowledge that crops require a consistent supply of water for the plant to reach optimal growth.

It has been stated by researchers that heavy clay soils lose b 70% of their trapped moisture through evaporation while very sandy soils lose 65% of their trapped moisture through gravitational leaching.

To limit gravitational leaching, one technique employed has been the placement of a layer of asphalt underground to retard the leaching. Although this technique did reduce leaching, the asphalt also restricted root growth extension and created a potential problem of a perched water table.

The leaching problem extends past water loss and into the loss of fertilizer chemicals which can find their way into the ground water before the crop has a chance to utilize them. Where groundwater contamination is pronounce, one solution is the use a plastic sheet under the soil's surface to retard leaching of moisture and chemicals into the underground water table. Again, this solution creates more problems than it solves by retarding root growth and by creating a perched water table.

In more modern times, the use of water absorbent polymers has become more widely used. The traditional "reasoning" on polymers is that they act as "water banks" or "reservoirs" for the crop to draw upon.

In U.S. Pat. No. 5,303,663, the use of polymers is discussed and the stated advantage is that the technology creates a "blanket" of moisture retaining particles for the plant roots. This blanket can hold only a certain amount of water which is insignificant to that required to satisfy a growing crop's moisture requirement.

In one controlled application, a five year old polymer blend installation into an alfalfa field has for five years demonstrated that a treated field produces approximately 35% more hay while using 50% less water and 50% less fertilizer than in an adjacent field which has not been treated.

Following the "reservoir" philosophy, with the absorption capacity of the polymer at 200–400 times, and at the recommended application rates of 20 pounds per acre in agriculture applications, the maximum water storage capacity is only 4000 pounds of water per acre. An active growing agricultural crop uses about 40,000 pounds of water per day. Six inches of saturated loam type soil holds about 400,000 pounds of water.

The polymer reservoir constitutes less than 2% of the retention in the loam. A 2% increase in water cannot account for the fifty percent reduction in water use experienced.

Obviously, the technological reasoning behind the use of polymers is flawed; and as such, optimal polymer use in agriculture cannot be obtained.

It is clear from the foregoing that there continues to be a need for effective control and utilization of irrigation water.

SUMMARY OF THE INVENTION

The invention is a technique for increasing water and nutrient retention in a crop in which water absorbent polymers are applied to the land's surface and are then blended into the top six inches of the soil. The polymers, are of such small size that in a dry state, they fit into voids between grains in the soil. As the polymer retains water and swells, the swollen polymer seals these voids and creates a barrier preventing water and fertilizer from passing through and being lost to the crop. The preferred size of the polymer is less than 2 millimeters.

In this invention, neither a water bank nor a water blanket is created, but by proper evaluation of the soil texture and the addition of a controlled blend of polymers, the invention creates a water or moisture barrier so that the majority of the applied water and nutrients are held in the plant's root zone.

This barrier is slightly permeable which allows oxygen accessibility to the plant's roots, and it doesn't restrict the plant's root growth extension or create a perched water table.

This invention's barrier is impervious enough to significantly reduce the rate of moisture leaching from gravity, and also evaporation through capillary action.

The preferred water absorbent polymer is a crosslinked polyacrylamide which is a high-absorbent polymer based on acrylamide. When combined with a poly-acrylate, the polyacrylamide/acrylate combination has enhanced characteristics which are preferred in most soil applications.

In one embodiment of the invention, the water absorbent polymer is mixed with zeolite having comparable sizes. The zeolite provides a mixing agent so that the polymer can be more easily spread over the top of the soil. Further, the zeolite absorbs both moisture and ammonia; thereby providing an additional slow release mechanism for nitrogen (for the crop's use) derived from the ammonia.

Zeolite is a group of hydrous tectosilicate minerals characterized by an aluminosilicate tetrahedral framework, ion-exchangeable large cations, and loosely held water molecules permitting reversible dehydration. This includes analcime, chabazite, natrolite, and stilbite.

In the preferred application embodiment, the soil is completely dry and free of clods or slabs of caked soil.

An even broadcast pattern at the specified rate (as discussed below) is applied to the surface of the soil. If only the polymer is being applied, then it is recommended that an air delivery system with nozzles no more than 24 inches off the ground be used to evenly distribute the blend on the soil's surface.

If the blend also contains the zeolite, then any standard broadcast mechanism such as a "whirly bird" type of broadcast system can be used in addition to the air delivery system. The purpose of the zeolite is to act as a carrier for the polymer to facilitate easier and more even distribution. The zeolite's characteristics also compliment the polymer because of its moisture and ammonia absorption characteristics which act as a slow release mechanism for nitrogen application in the form of $NH_4$. Zeolite also aids in moisture transfer in the root zone.

After the mixture is applied to the surface, within one to four days, prior to the product getting wet, the mixture is blended into the top four to six inches of soil. This is accomplished using a variety of instruments including a rotary harrow or a mulcher. This also is usually the final step of land preparation before seeding of the crop.

Although plowing or disking of the soil is acceptable, it is not preferred as it does not create a uniform blend of the particles to form the barrier discussed above. Rather, plowing or disking of soil tends to create a slabbing affect and thereby curtail the sought after "barrier affect".

Grain size is kept small to allow for the creation of the "barrier affect". This allows the grains to fit into the "voids" between soil grains and then swell to seal the voids.

The preferred grain size is a mixture in which 70–80% of the grains are no greater than 0.3 mm with the remaining 20–30% having grain size between 0.5 mm and 2.0 mm. In other embodiments, grain sizes of up to 3 mm are acceptable with the smaller particle sizes ranging up to 0.5 mm.

Another mixture is where 100% of the grains are in the 0.1–0.5 mm range.

The amount of soil grains per cube is many times greater in clay soils than in sandy soils, therefore the blend of polymer grain sizes must be formulated so the desired barrier is created both in clay and sandy type soils.

With polymer or polymer/zeolite (preferably a 50–50 or 40–60 for the polymer/zeolite ratio) mixture, application to the soil is preferably guided by the following table:

| | POUNDS PER ACRE | |
|---|---|---|
| Type of Soil | Polymer alone | Polymer/zeolite blend |
| Sandy | 9 | 20–25 |
| Heavy Clay | 12 | 25–30 |
| Turf | 100 | 180–225 |

A variety of absorbent polymers are available for this application. Besides the following commercially available polymer products, those of ordinary skill in the art readily recognize various other products which serve this function.

STOCKHAUSEN—Series 400 Stock-o-sorb: This is a potassium based polyacrylamide/acrylate.

CHEMTAL—Series 3005: This is a potassium or sodium based polyacrylamide/acrylate super absorbent polymer.

CHEMDAL: This is a super absorbent acrylate polymer based on potassium.

As noted earlier, for some applications (either due to soil conditions or the desired method of application) the use of zeolite is preferred. In this context, the following commercially available zeolite is preferred:

G S A RESOURCES: This company provides a zeolite which is ground to the desired size to be compatible with the polymer blend in use. It is recommended that only zeolite with a loose potassium radical be used and that the zeolite with a loose sodium radical be avoided.

Another important aspect of this invention is the use of the water absorbent polymer (with or without zeolite) in conjunction with a linear polymer such as polyacrylamide (also known as "PAM").

The incorporation of PAM after the water absorbent polymer has been applied provides for a firming of the soil to reduce erosion. Application of PAM, which is usually applied in conjunction with irrigation water, is facilitated by the already applied water absorbent polymer as the PAM is kept near the surface of the soil to increase the erosion resistance of the soil and to stabilize infiltration.

In this context, the cross linked super-absorbent polymer in grain size distribution from 0 to 0.30 mm, is blended in amounts of 25% to 60% of the total volume with a specific type of mined mineral known as zeolite in a mesh size of 14×40 to make up the balance of the total volume of 100%. Specific combinations by weight are specified for applications depending upon the amount and type of plants to be planted within a given area and type of soil in which the planting is to take place.

In the preferred embodiment, this blend of polymer and zeolite is evenly broadcast over the surface of the soil and blended into the top 3" to 6" of topsoil by means of a tilling machine normally available to the average farmer such as a tandem disk, rotary harrow, roto-tiller, or mulcher. After the surface application, the tillage into the subsurface must be accomplished prior to irrigation or rain and usually prior to planting. In some applications, the water absorbent polymer has been added after the planted crop has emerged from the soil in a type of farming known as ridge till in which the soil is mechanically moved from the furrow to be ridged along the crop line.

The broadcast rate for a sandy soil field is twenty pounds per acre evenly distributed to optimize seed germination, holding water and applied chemicals in the plant root zone and retard leaching of applied liquids into the underground water table. A slightly higher application rate is used on heavy clay type soils to retard evaporation into the air resulting from capillary action of soil applied liquids rising to the surface.

Normal tillage and rotation of crops on an annual basis or semi-annual basis gives a single application a 4 to 7 year life of providing optimum benefits.

One asset of a complete field application is the invention's ability to even out a field. In a field with heavy clay type soil spots or very sandy soil spots, the water absorbent polymer aerates the heavy clay and enhances the moisture holding capability of the sandy spots, thereby compensating for uneven soil structure experienced in most fields.

A single application of the water absorbent polymer provides optimal results for a period of four to seven years. The useful life of the invention depends upon the amount of tillage the field receives. Ultra-violet rays of the sun destroy the polymer, therefore the more polymer that is brought to the surface from tillage, the less beneficial product remains in the subsurface.

In the preferred embodiment, the broadcasting of the water absorbent polymer over the total surface area is replaced, for economic purposes, by banding the blend into the soil only in the seed row. The width of this band is recommended to be no less than eight inches wide and blended into the top three inches of top soil at a rate in sandy soil of 8 to 10 lb. per acre.

The purpose of this type of application is to concentrate the water and chemical holding capability of the blend in the seed row to aid in seed germination, and the potential root area to aid in plant growth. This type of application, along the seed row itself, is easily accomplished using a traditional seed planters which has both a seed and a fertilizer box with a mild tilling mechanism tailing the last applicator.

PAM, the short generic designation for polyacrylamide, is a linear long chain polymer which has been used successfully for many years as one of the initial treatments in municipal water systems. PAM dissolves in water and causes the small soil particles to cling together thereby creating a heavier particle which, because of gravity, falls to the bottom of the container.

PAM has also been used in furrow field irrigation systems to reduce the erosion of the soil as the water runs down the furrow to irrigate the planted crop. The application was so successful that greater than ninety-five percent of the erosion was stopped in most applications. PAM is to be applied after each cultivation or soil disturbance.

PAM is commercially available from a variety of sources including, American Cyanamid and manufactured by Cytec.

While PAM has been able to benefit a wide number of agricultural settings where the field has a homogenous soil throughout the field, it has not been as effective where a large field has a sandy area in the middle of the field. In this situation, the water containing the PAM flows as far as the sandy spot and then goes no further because the sandy area acts as a large reservoir draining the water from the furrow so the remainder of the field goes dry. Very few large fields are perfectly homogenous, therefore, trying to successfully use PAM to furrow or flood irrigate long runs in a field with slight to radical soil variations is sometimes very difficult.

This problem is solved when the field is first treated with the water absorbent polymer discussed above. This water absorbent polymer creates a semi-permeable barrier in the top few inches of soil which significantly retards the leaching and evaporation of applied water and chemicals. The PAM, when applied in the irrigation water, flows easily without inordinate leeching so that the PAM has maximum affect.

The combination of water absorbent polymers with PAM create a situation which have a large number of benefits. The combination:

1. greatly reduces erosion of top soil in areas of applied irrigation water. This includes furrow irrigation, flood irrigation, and sprinkler irrigation. In all these applications the PAM product must be mixed with the irrigation water. The reduction of erosion will allow water to be applied to a field at a greater rate thereby using less water to completely irrigate a field.
2. assists in retaining the soil profile thereby increasing the rate of water infiltration into the soil both laterally and vertically. This increase in the rate of lateral movement will lessen the time needed to apply water for initial seed germination thereby decreasing the amount of water need be applied.
3. creates a semi-permeable barrier in the soil slowing the leaching of applied moisture and chemicals caused by gravity and the slowing of surface evaporation caused by capillary action of the retained liquids. This retaining of the applied moisture and chemicals in the root zone for longer periods of time allows the plant a longer time to utilize the available moisture and nutrients resulting in less moisture and chemicals need to be applied and/or greater plant growth and fruit production.
4. creates a semi-permeable barrier in the soil allowing the plant more time to utilize the applied moisture and applied chemicals thereby greatly reducing the leaching of harmful chemicals such as nitrates into the underground water tables.
5. by slowing the leaching or evaporation of the applied moisture, maintains the seed wrapped in a thin blanket of moisture for longer periods of time, virtually guaranteeing germination which results in greater plant population. This results in an increase in yield per acre or is extrapolated that less seeds per acre need be planted.

The invention, together with various techniques involved therewith, will be more fully described by the accompanying drawings and the following description.

DRAWINGS IN DETAIL

Figure 1A:
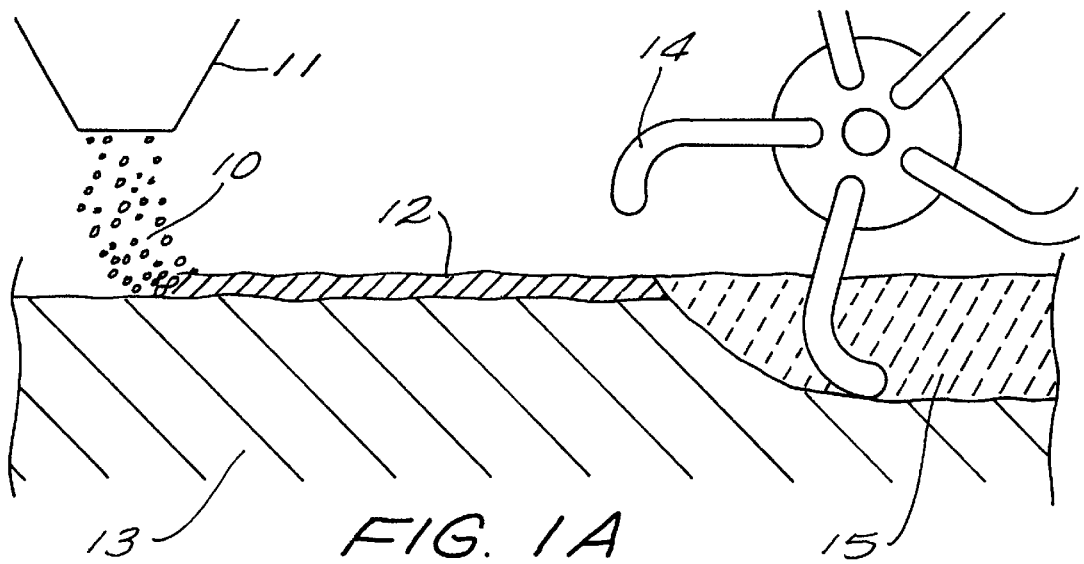
FIG. 1A graphically represents a cross-section of agricultural land showing the distribution and then blending of a mixture of water absorbent polymer.

FIG. 1A graphically represents a cross-section of agricultural land showing the distribution and then blending of a mixture of water absorbent polymer.

Although this illustration shows the steps in a single figure and as such are presumably done substantially simultaneously, the preferred embodiment performs the steps individually with a time lapse between the steps. The three stages are illustrated in a single figure for ease of description only.

Mixture 10 is dispersed over the agricultural field 13 using either hopper 11 or through a whirly bird (not shown). This dispersal creates layer 12 of the mixture.

In this context the mixture is any of those already discussed above. This includes: a mixture composed solely of water absorbent polymer; a mixture having water absorbent polymer and zeolite; a mixture of polymer, zeolite, and a chemical fertilizer; and a mixture of polymer, zeolite, fertilizer, and crop seeds. In essence, the mixture consisting of the water absorbent polymer mixed with any combination of: zeolite, fertilizer, and/or crop seed.

Once layer 12 has been established, in the preferred embodiment, it is allowed to remain on the surface of the soil for a period of time (usually one to four days) before a tiller 14 is used to blend, 15, the top layer of soil and layer 12.

Figure 1B:
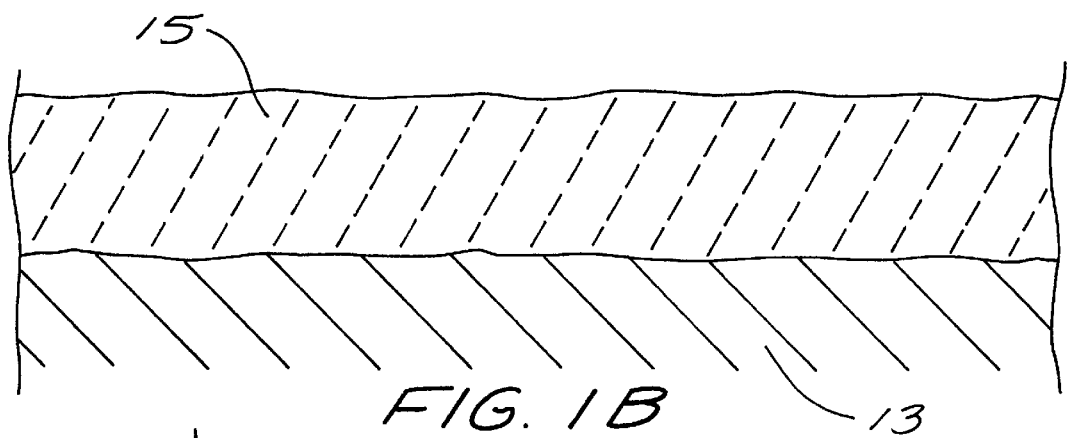
FIGS. 1B and 1C are graphical cross sections showing the agricultural land which has had the water absorbent polymer blended into the top layer of soil and then the crop growing in and through this top layer.
Figure 1C:
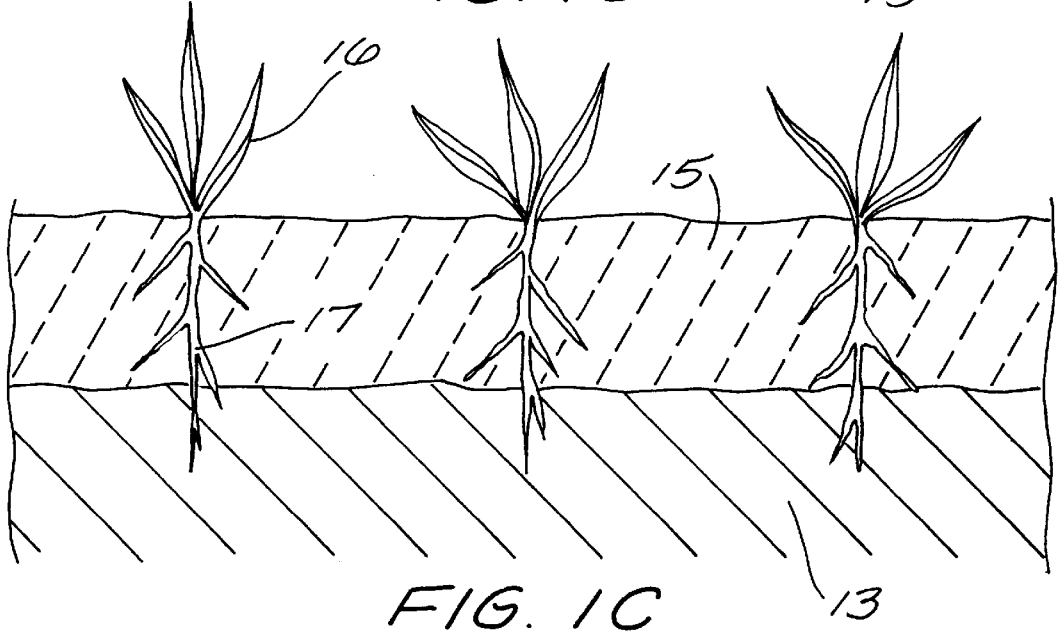

FIGS. 1B and 1C are graphical cross sections showing the agricultural land which has had the water absorbent polymer blended into the top layer of soil and then the crop growing in and through this top layer.

In the preferred embodiment, the blended portion constitutes about six inches of the top layer and thereby provides a water barrier to restrict water from seeping through the barrier into the underlying soil 13 and away from the crop's roots 17. Although a plant or tree's roots may extend many inches or feet into the subsurface, in most instances, the majority of the moisture and nutrient up-take occurs in the shallow subsurface area.

In a similar fashion, barrier layer 15 also prevents water within the soil from escaping through evaporation since water in layer 15 is restricted from moving upward through capillary action as well as downward due to gravity.

This barrier is not a complete seal, which would be detrimental to the growth of crop 16. Rather, the water barrier "restricts" flow of water but still lets roots 17 to easily pass through barrier 15 and into the underlying soil.

Further, since water barrier 15 doesn't totally preclude the passage of water into the underlying layer 13, problems with perched water tables are totally eliminated.

Figure 2A:
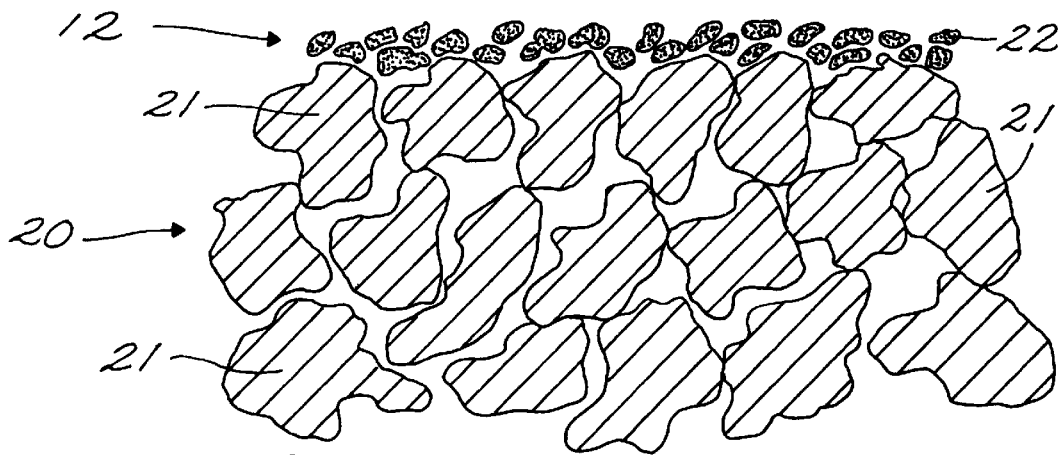
FIGS. 2A, 2B, and 2C diagram the placement of the polymer mixture, its blending, and forming of a water barrier in the grains of soil.
Figure 2B:
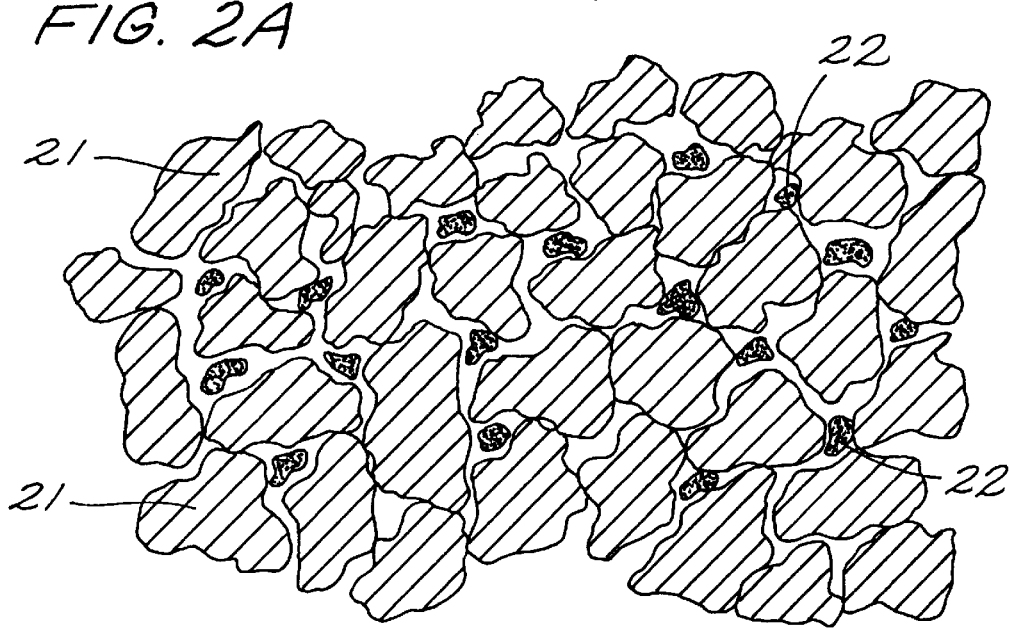
Figure 2C:
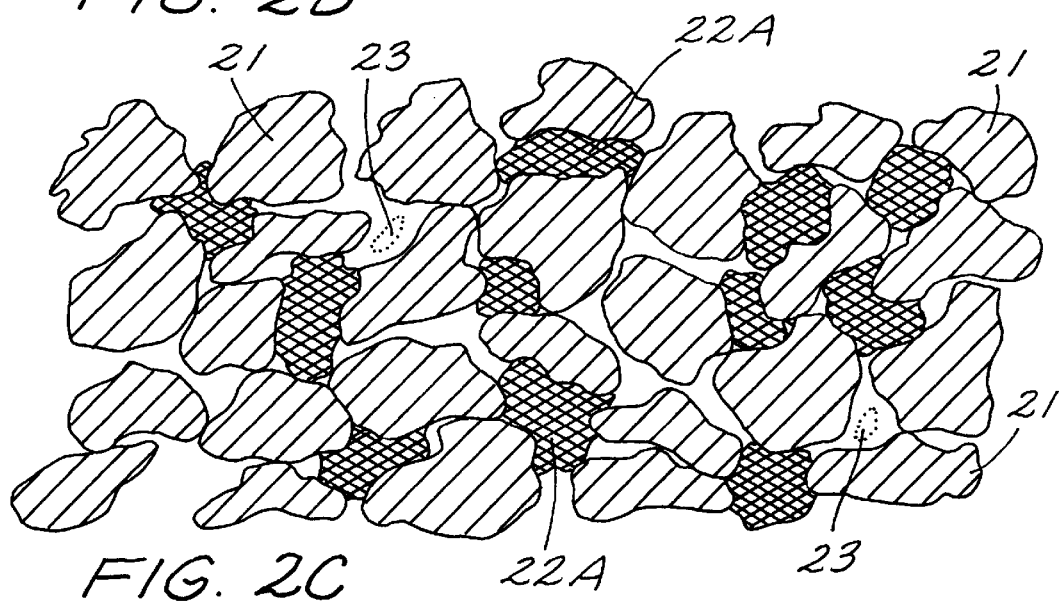

FIGS. 2A, 2B, and 2C diagram the placement of the polymer mixture, its blending, and forming of a water barrier in the grains of soil.

Layer 12 is composed of polymer particles 22 which are substantially smaller than soil particles 21 of layer 20. After layer 12 has been placed on the soil, the top layer is blended permitting the polymer particles to occupy spaces between the soil particles 21.

As the dry polymer particles 22A collect moisture, they swell and seal the gaps between the soil particles 21. In this manner, they help to partially seal the gaps between soil particles 21 and restrict water from either settling due to gravity or from rising and escaping due to evaporation.

In a similar fashion, the polymer particles 9 absorb both liquid fertilizer and liquid herbicides to maintain these agricultural chemicals in the root and seed germination zones for more efficient use of the chemicals.

Note, in this embodiment, seeds 23 were included in the polymer mixture and are automatically embedded in the soil, ready to grow.

Figure 3:
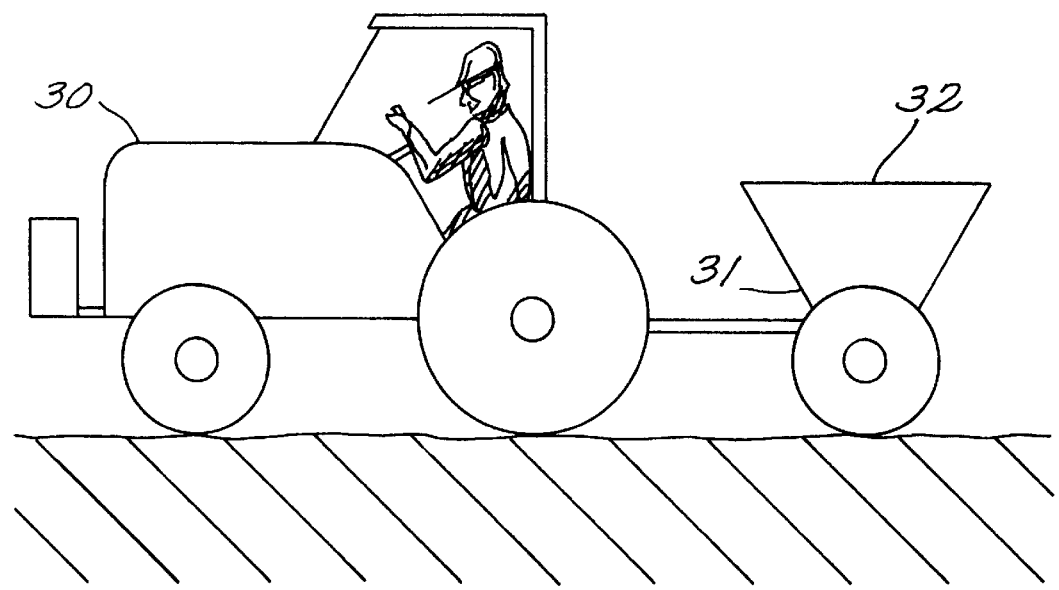
FIG. 3 illustrates the preferred method used to disperse the mixture over the top of the soil.

FIG. 3 illustrates the preferred method used to disperse the mixture over the top of the soil.

Although there are a large number of ways to disperse the mixture containing the water absorbent polymer onto the land, the preferred method uses tractor 30 to pull wagon 31 with hopper 32 thereon. At the bottom of hopper 32 is a driven mechanism which drops the mixture onto the land at a controlled rate based upon the distance traveled.

In this manner, an even and consistent layer of polymer mixture is dispersed over the agricultural land.

As described above, the invention creates an easily applied chemical barrier which reduces the leaching of chemicals into the underground water tables and away from the surface crop. This same barrier holds water near the surface and inhibits its seepage away from the crops. Also, because the barrier is composed of expanding/shrinking polymers, compaction of the soil is reduced due to the natural actions of the polymers.

When the polymer is mixed with other minerals, the barrier also becomes a "fertilized" zone for increased crop yields.

Figure 4:
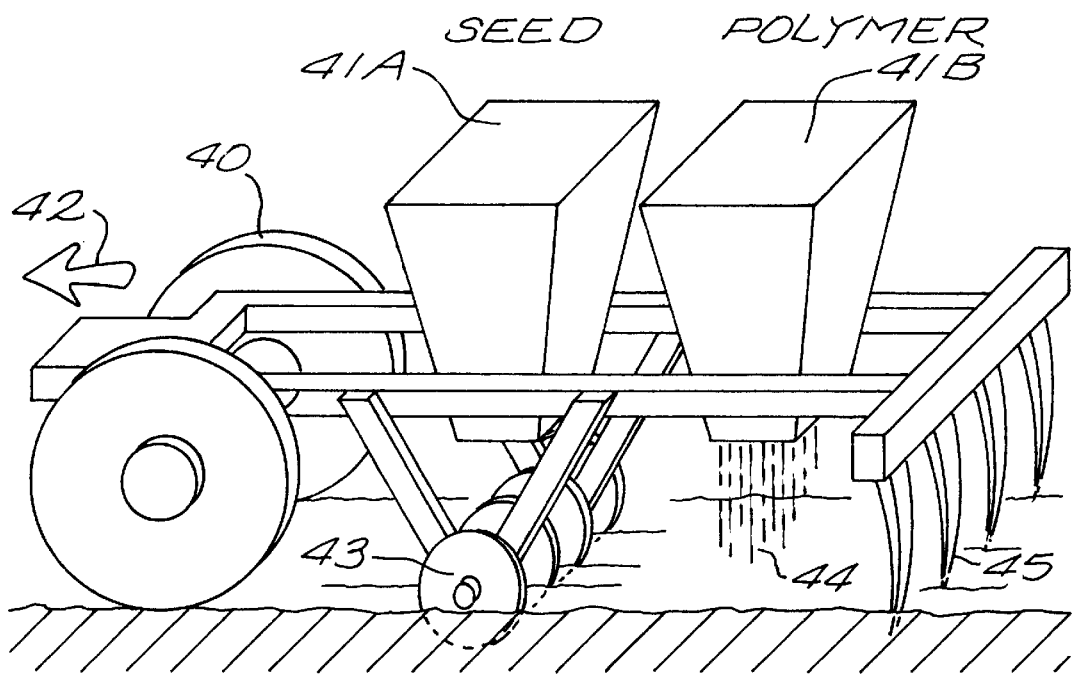
FIG. 4 diagrams an apparatus used for the substantially simultaneous planting of seeds, dispersement of water absorbent polymer, and the mixing of the polymer into the soil.

FIG. 4 diagrams an apparatus used for the planting of seeds, dispersement of water absorbent polymer, and the mixing of the polymer into the soil.

The planter of this illustration is supported by wheels 40 and is pulled through the field as indicated by arrow 42. As the planter is pulled, seed is dispensed from hopper 41A into disk blade 43 which cuts the soil and dispenses the seed therefrom.

Immediately following, hopper 41B dispenses a layer of polymer along the seed row. This polymer is then mixed into the soil by thines 45.

In this manner, the row of seed is planted and the area around the seed is treated with the water absorbent polymer to assist in the germination of the seed.

While this embodiment shows the seed hopper 41A preceding polymer hopper 41B, this arrangement is reversed in other embodiments as the two processes (planting and polymer embedding) are done substantially simultaneously.

Figure 5:
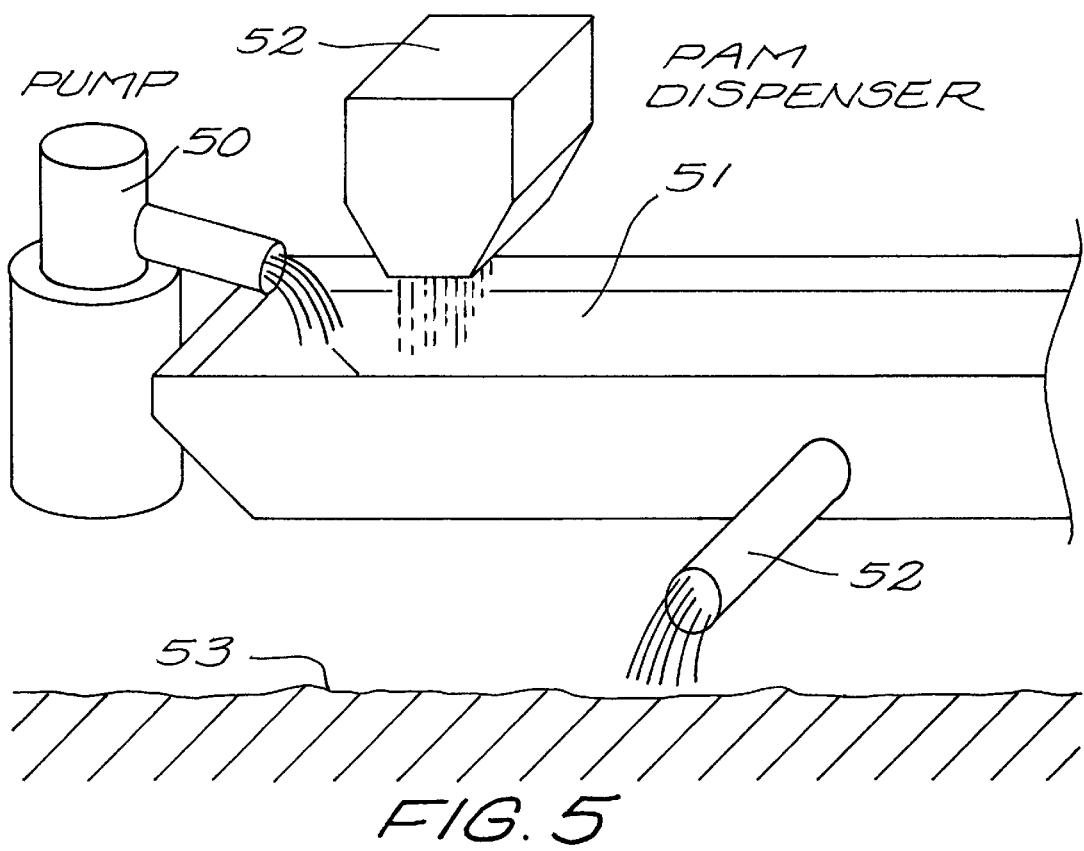
FIG. 5 diagrams the second step, the application of PAM, to an agricultural field.

FIG. 5 diagrams the second step, the application of PAM, to an agricultural field.

Once the field has been treated as described above with the water absorbent polymer, the preferred embodiment then applies PAM to the agricultural field to discourage erosion and maintain infiltration.

This figure illustrates, in graphical form, the preferred method for treating the agricultural field with PAM.

Irrigation water 50 is pumped into ditch 51. PAM is applied from dispenser 52 into ditch 51 and mixes with the water therein due to the natural flow of the water. This mixture is dispensed from ditch 51 via pipe 52 onto agricultural field 53 where the mixture floods over the field.

This application of PAM, as so illustrated, is facilitated by the prior incorporation of the water absorbent polymer into the top six inches of the agricultural field. The field so treated (with both water absorbent polymer and a linear polymer such as PAM), utilizes water very efficiently and also minimizes erosion of the soil.

It is clear from the foregoing that the present invention is a highly improved application technique which assists in crop growth while reducing water and fertilizer demands and conserving top soil.

What is claimed is:

1. A technique for treating agricultural land to increase water retention capabilities of the soil comprising a broadcaster and involving the steps of:
    a) distributing a substantially even spread of water absorbent polymer particles by said broadcaster over a soil surface;
    b) blending the water absorbent polymer particles into an upper level of said soil; and,
    c) applying a linear polymer to said soil surface during irrigation of said soil surface.

2. The technique according to claim 1, wherein the step of applying a linear polymer further includes the step of mixing a polyacrylamide into irrigation water.

3. The technique according to claim 2, wherein the step of applying a linear polymer includes the step of flood irrigating the soil surface.

4. The technique according to claim 1, further including the step of sizing said water absorbent particles such that at least 60% of said water absorbent polymer particles have a grain size less than 0.5 mm.

5. The technique according to claim 1, wherein the step of blending the water absorbent polymer includes the step of activating a tilling action through said water absorbent polymer and said upper layer of said soil.

6. The technique according to claim 5, further including the step of, simultaneous with the step of distributing a substantially even spread of water absorbent polymer particles, distributing a substantially even spread of zeolite particles having a particle size substantially equal in weight to said water absorbent polymer particles.

7. The technique according to claim 6, further including the step of, simultaneous with the step of distributing a substantially even spread of water absorbent polymer particles, distributing a substantially even spread of fertilizing chemicals.

8. A technique for treating agricultural soil to increase the water retention capabilities of the soil comprising the steps of:
    a) creating a mixture of water absorbent polymer particles and zeolite;
    b) distributing said mixture over a surface of agricultural soil;
    c) blending the water absorbent polymer particles into an upper six inches of said agricultural soil; and,
    d) applying a linear polymer to said surface of agricultural soil.

9. The technique according to claim 8, wherein the step of applying a linear polymer includes the step of mixing said linear polymer to irrigation water being applied to said surface of agricultural soil.

10. The technique according to claim 9, wherein the step of applying a linear polymer includes the step of flooding said surface of agricultural soil with a layer of irrigation water and polyacrylamide.

11. The technique according to claim 10, wherein said agricultural soil has an average particle size and further including the step of choosing a particle size of said water absorbent polymer wherein at least 60% of the particles of said water absorbent polymer in said mixture are substantially smaller than the average particle size of said agricultural soil.

12. The technique according to claim 10, wherein the step of creating a mixture includes the step of sizing said mixture such that all particles in said mixture have a particle size of less than 3 millimeters and wherein at least fifty percent of the water absorbent polymer particles have a particle size of less than 0.5 millimeters.

13. The technique according to claim 12, wherein the step of blending the water absorbent polymer into the agricultural soil includes the step of mulching said water absorbent polymer particles into a top six inches of said agricultural soil.

14. The technique according to claim 12, wherein the step of blending the water absorbent polymer into the agricultural soil includes the step of activating a tilling action through said mixture and the upper six inches of agricultural soil.

15. The technique according to claim 12, further including the step of, simultaneous with the step of distributing a substantially even spread of mixture, distributing a substantially even spread of agricultural chemicals adapted to assist plant growth.

16. The technique according to claim 8, further including, using a single apparatus, the steps of:
   a) implanting a row of seed into the agricultural soil; and,
   b) distributing and blending the water absorbent polymer into the agricultural soil along the row of seed.

* * * * *